June 11, 1968 W. A. THORNTON, JR 3,388,277
ELECTROLUMINESCENT DEVICE COMPRISING ELECTROLUMINESCENT FILMS
EMITTING LIGHT OF COMPLEMENTARY COLORS
Filed Sept. 27, 1966
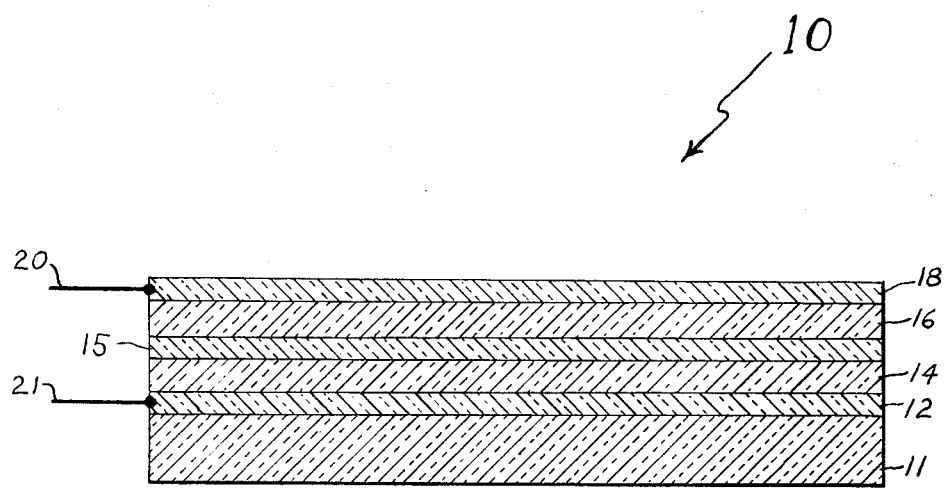
INVENTOR.
WILLIAM A. THORNTON, JR.
BY Harvey L. David
John W. Pease

United States Patent Office 3,388,277
Patented June 11, 1968

3,388,277
ELECTROLUMINESCENT DEVICE COMPRISING ELECTROLUMINESCENT FILMS EMITTING LIGHT OF COMPLEMENTARY COLORS
William A. Thornton, Jr., Cranford, N.J., assignor, by mesne assignments, to the United States of America as represented by the Secretary of the Navy
Filed Sept. 27, 1966, Ser. No. 583,117
1 Claim. (Cl. 313—108)

ABSTRACT OF THE DISCLOSURE

A white light emitting electroluminescent film device utilizing molecular electroluminescent films prepared by evaporation techniques, the device comprising two such electroluminescent layers characterized by emission of light of colors which are complementary, e.g., orange or yellow, and blue, so that the combined emission is of substantially white light, the electroluminescent films being separated by a barrier layer of silicon oxide to prevent migration of doping elements therebetween, and electrode means for subjecting the electroluminescent films simultaneously to an electrical field.

---

This invention relates to electroluminescent film devices, and more particularly to improved luminescent devices capable of emitting light resulting from combinations of light emission, e.g., white light as a result of combined orange or yellow and blue emission. Typical uses of electroluminescent devices are an area or panel lamps, and as a subcombination in image intensifiers. In the latter instance the matter of resolution becomes very important.

Heretofore, white light emission by electroluminescence has generally been obtained from certain white light emitting powders or mixtures of powders, the combined emissions of which produce substantially white light. Such powders are supported or suspended in a dielectric medium or vehicle to form an electroluminescent layer or coating, or are fired onto a ceramic base. The resulting devices have been characterized by poor resolution, low brilliance and poor transparency.

It has been known that improved resolution, brilliancy and transparency of a single color emitting device can be obtained by evaporating a suitable phosphor such as ZnS (zinc sulfide) onto a glass substrate, activating with one or more selected impurities such as manganese, copper, chloride, or iodide, and then firing to form a molecular film of electroluminescent material as opposed to a layer of suspended powder or mixture of powders. Accordingly, the use of the terms "electroluminescent film" or "film" hereinafter will have reference to layers prepared by this evaporation technique rather than by coating with powders or mixtures of powders.

Among the individual colors readily obtainable from electroluminescent film devices are green, blue, orange and yellow. However, white light emitting film devices have not been available because known white emitting phosphor powders or mixtures of powders do not lend themselves well to the film forming process of evaporating and firing, for example because of decomposition of the luminescent material in the process, or because of undesirable reactions between the mixed powders or their activating impurities during the film forming process. Moreover, attempts to form two electroluminescent films of two different colors one on the other to provide combined emission have been unsuccessful because of diffusion of impurities between the films.

Accordingly, it is a primary object of this invention to provide an improved electroluminescent film device, as distinguished from devices having one or more layers or coatings of powder in dry or suspended form, capable of emitting substantially white light.

Another object of this invention is the provision of an electroluminescent film device having a plurality of electroluminescent film layers providing a combined emission and having relatively high resolution as compared to electroluminescent powder layer devices.

As another object this invention aims to accomplish the foregoing by providing first and second electroluminescent films disposed on opposite sides of a barrier layer of silicone oxide, and electrode means for subjecting said layers to an electrical field.

Yet another object of this invention is the provision of an improved process for producing electroluminescent film devices of the previously described character, which process comprises the steps of evaporating a first phosphor onto a base member, adding an activator and firing to provide a first electroluminescent film for emitting light of a first color, evaporating onto the first electroluminescent film a transparent layer of silicon oxide, evaporating a second phosphor onto said layer of silicon oxide, adding an activator and firing to provide a transparent second electroluminescent film separated from the first electroluminescent film by the layer of silicon oxide, and providing electrode means for subjecting the films to an electrical field.

Other objects and advantages of the invention will become apparent from the following detailed description thereof when read in conjunction with the accompanying drawing forming a part of this specification, and in which the sole figure is a schematic sectional view of an electroluminescent device embodying the invention.

In the form of the invention illustrated in the drawing and described hereinafter, there is provided an electroluminescent film device 10 which will, when energized from a suitable voltage source, produce or emanate substantially white light of good brilliance and capable of high resolution. The device 10 comprises a base member 11 which is conveniently in the form of a transparent substrate such as a glass plate. An electrically conductive, transparent layer 12 is formed on one surface of the base member 11 as by deposition of a very thin metallic coating, for example tin oxide, thereon. The conductive layer 12 serves as an electrode for use in subjecting electroluminescent films to an electrical field as will become apparent as the description proceeds.

An orange or yellow light emitting, electroluminescent film 14 is formed in a conventional manner on the base member 11 over the conductive layer 12 such as by evaporation of a suitable phosphor such as zinc sulfide (ZnS) so that the vapor of the phosphor is deposited on the layer 12 in the form of a very thin film 14 which is on the order of only a few microns in thickness.

The film 14 is then doped or activated to provide electroluminescence of the desired color, preferably by embedding the conductively coated base member 11 and the film 14 thereon in a bed of activating powder and firing at an elevated temperature, usually under 900° C. The activating powder released activating impurities to effect electroluminescence of a desired color when the film 14 is subjected to a suitable electrical field. For example, activation in an ammonium chloride (NH$_4$Cl) treated bedding power will result in a characteristically yellow emanating, chloride activated zinc sulfide (ZnS:Cl) electroluminescent film 14, while use of a manganese containing bedding powder can provide an orange light emitting electroluminescent film 14 (ZnS:Mn).

Next, a thin, transparent layer 15 of SiO (silicon oxide) is deposited as by a similar evaporation process onto the emitting film 14. Then a thin, transparent film 16 of a suitable phosphor such as ZnS is deposited by evaporation onto the SiO layer 15 but is activated to be blue light emiting by firing in a suitably treated bedding phosphor, for example one which diffuses copper into the film. The resulting ZnS:Cu sensitized or activated film emits characteristically blue light when subjected to an electrical field.

Lastly, an electrically conductive layer 18 is disposed adjacent to the blue emitting film 16. This layer may, if the application of the device 10 requires, be transparent and may be disposed directly on the film 16. To this end the layer 18 may typicaly be an evaporated conductive film of aluminum. Alternately, the conductive layer 18 may be separated from the film 16 by a strata of glass or the like as when the device 10 forms a subcombination of a light intensifier device.

The purpose of the SiO layer 15 is to serve as a barrier against migration of impurities between the activated, light emitting films 14 and 16, and against the introduction of impurities from other sources into either of these films, which impurities would deleteriously affect the light emitting qualities of the films.

When the conductive layers 12 and 18 are connected, as by conductors 20, 21, to a suitable voltage source, the films 14 and 16 are subjected to an electrical field which causes them to luminesce with their characteristics colors, orange and blue, for example. The combined orange and blue emissions complement one another to produce substantialy white light.

Because of the molecular film character of the films 14 and 16, the device 10 is capable of high resolution. That is to say, the light emanations may be considered to be substantially uniform from all points within the emanating area of the device, as distinguished from powder layer devices wherein the emanations vary from point to point due to the granular character of the powder layers.

This high resolution ability of devices embodying the present invention is particularly important when utilized in image intensifying apparatus wherein the attainment of a "sharp" image is dependent in part upon a uniform, high resolution, area type light source.

Of course the conductive layers 12 and 18 which act as field electrodes, may be supported by other means than the mentioned glass base member 11 and film 16, particularly when the light emanating films 14 and 16 and their barrier layer 15 form part of an appartus such as an image intensifier wherein one or more of the conductive layers may be supported on a photoluminescent, image producing screen. Moreover, in some applications as an area type light source, one of the conductive layers 12, 18 need not be transparent but may be a metallic plate electrode such as of aluminum or the like.

While the invention has been described with reference to two electroluminescent films 14 and 16 separated by a layer of SiO, it will be understood that three or more electroluminescent films, may be incorporated into a single device, each separated from the next as by a layer of SiO.

Obviously many modifications and variations of the present invention are possible in the light of the above teachings. It is therefore to be understood that within the scope of the appended claim the invention may be practiced otherwise than as specifically described.

I claim:

1. A white emitting electroluminescent device comprising:
 a transparent base member;
 first electrode means comprising a transparent electrically conductive layer disposed on said base member;
 a first electroluminescent film of one of chloride activated zinc sulphide and manganese activated zinc sulphide for emitting light of a first color disposed on said first electrode means;
 a barrier layer of silicon oxide disposed on said first electroluminescent film;
 a second electroluminescent film of copper activated sulphide for emitting light of a second color disposed on said barrier layer with said barrier layer being between said first and second electroluminescent films;
 second electrode means comprising an electrically conductive layer disposed on said second electroluminescent film and cooperative with said first electrode means for simultaneously subjecting both of said electroluminescent films to an electrical field; and
 said first and second electroluminescent films being characterized by the emission of light of colors which are complementary whereby substantially white light is emitted upon energization of said electrode means.

References Cited

UNITED STATES PATENTS

| | | | |
|---|---|---|---|
| 2,867,739 | 1/1959 | Michlin | 313—108 |
| 3,046,154 | 7/1962 | Feldman | 313—108 |
| 3,172,862 | 3/1965 | Gurnee et al. | 313—108 |
| 3,260,879 | 7/1966 | Feuer | 313—108 |
| 3,267,317 | 8/1966 | Fischer | 313—108 |
| 3,339,075 | 8/1967 | Szepesi | 313—108 |

ROBERT SEGAL, *Primary Examiner.*